E. H. BELDEN.
MOTOR VEHICLE.
APPLICATION FILED AUG. 19, 1916.
1,270,774.
Patented July 2, 1918.
2 SHEETS—SHEET 1.
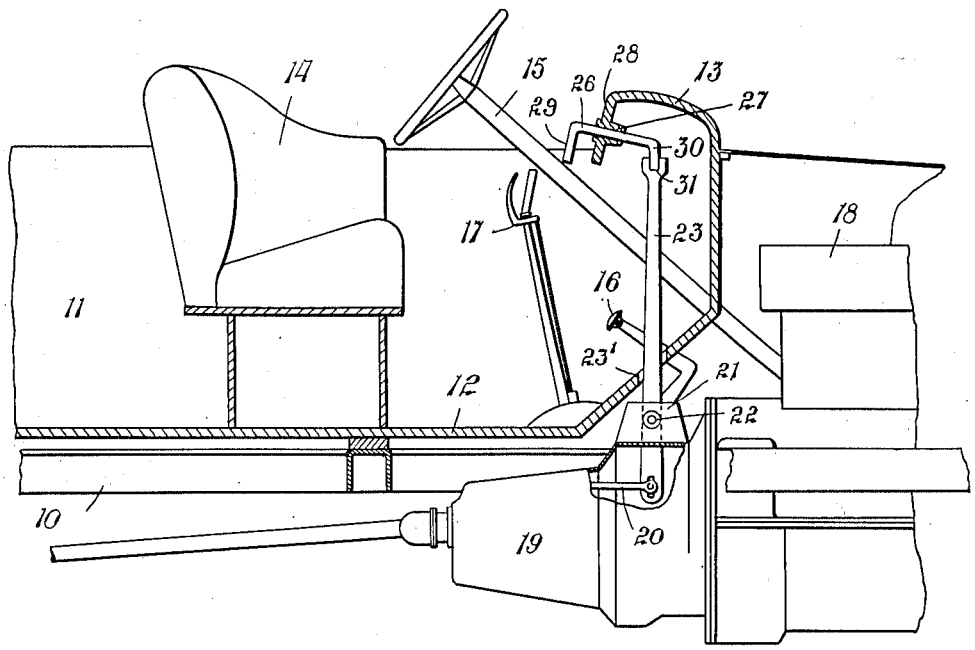
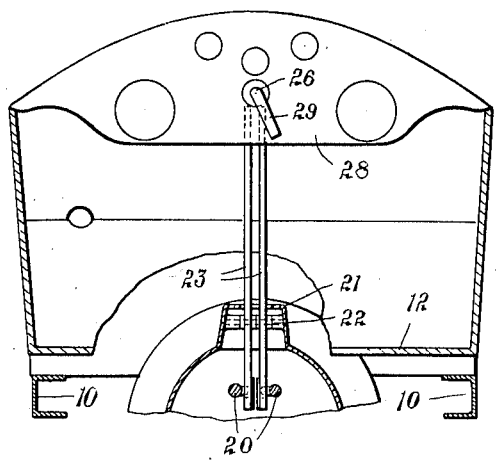
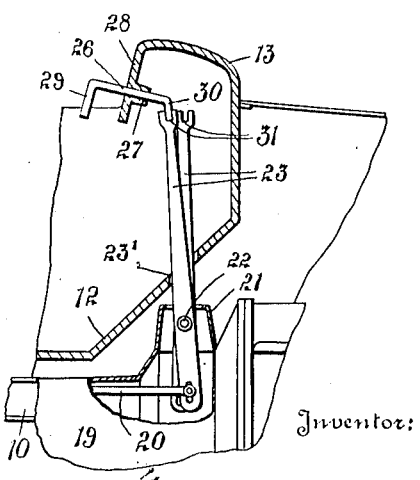
Inventor:
Edward H. Belden,
By Milton Tibbetts
Attorney.

E. H. BELDEN.
MOTOR VEHICLE.
APPLICATION FILED AUG. 19, 1916.
1,270,774.
Patented July 2, 1918.
2 SHEETS—SHEET 2.
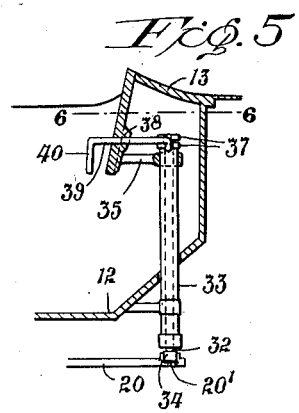
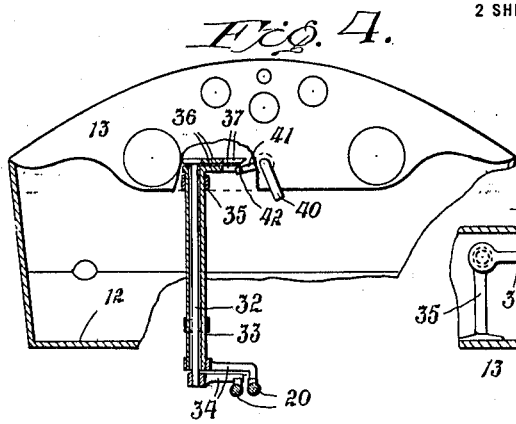
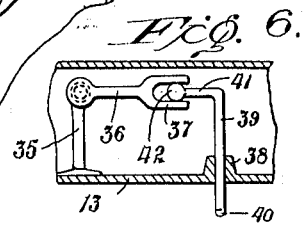
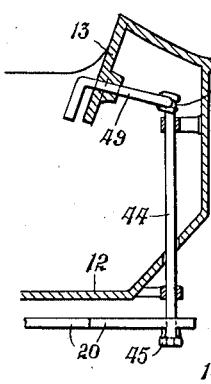
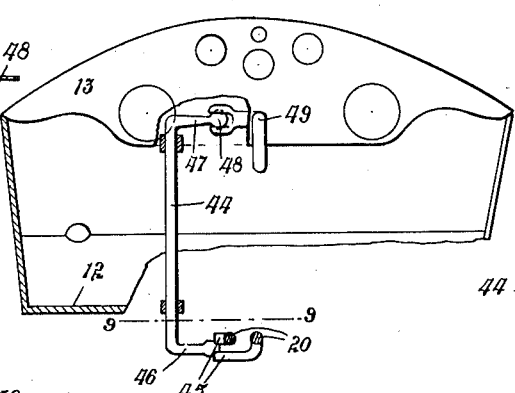
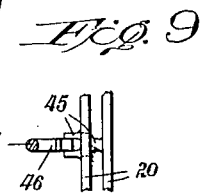
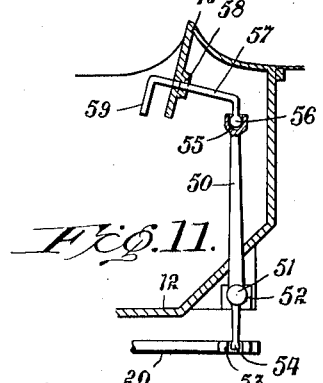
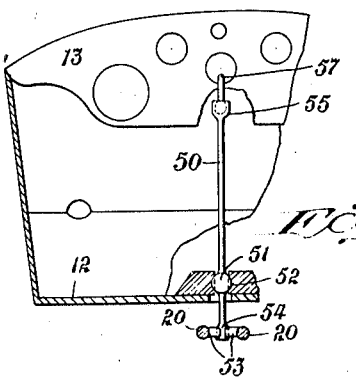
Witness:
G. F. Bakk.
Inventor:
Edward H. Belden,
By Milton Tibbetts,
Attorney.

UNITED STATES PATENT OFFICE.

EDWARD H. BELDEN, OF DETROIT, MICHIGAN, ASSIGNOR TO PACKARD MOTOR CAR COMPANY, OF DETROIT, MICHIGAN, A CORPORATION OF MICHIGAN.

MOTOR-VEHICLE.

1,270,774. Specification of Letters Patent. Patented July 2, 1918.

Application filed August 19, 1916. Serial No. 115,808.

*To all whom it may concern:*

Be it known that I, EDWARD H. BELDEN, a citizen of the United States, and resident of Detroit, Wayne county, State of Michigan, have invented certain new and useful Improvements in Motor-Vehicles, of which the following is a specification.

This invention relates to improvements in motor vehicles and particularly to the means for gear control.

Under some conditions it is desirable for the gear control means to be positioned at the right of the steering post so that it may be operated by the driver with his right hand. A gear shifter lever of the usual kind reduces the amount of foot and leg room and is therefore objectionable if placed on the right of the steering post. One object of the present invention is to provide a center gear control that does not reduce the amount of foot and leg room. Thus the advantages of a center control means are obtained without its disadvantages.

Another object of the invention is to arrange all but the handle of the gear control means well forward of the driver's seat where it will be out of the way of the occupants of the vehicle.

Another object of the invention is the provision of a hand operated device mounted on the vehicle body and adapted to engage and operate the gear shifter elements mounted on the vehicle frame, while at the same time permitting the ready removal of the body from the frame.

Other objects of the invention will appear from the following description taken in connection with the drawings, which form a part hereof, and in which:

Figure 1 is a side elevation and part section of a motor vehicle embodying one form of the invention;

Figs. 2 and 3 are detail views of the form of the invention shown in Fig. 1;

Figs. 4 and 5 are views similar to Figs. 2 and 3 of another form of the invention;

Fig. 6 is a section taken on the line 6—6 of Fig. 5;

Figs. 7 and 8 are detail views of a slightly different embodiment of the invention;

Fig. 9 is a section on the line 9—9 of Fig. 7; and

Figs. 10 and 11 are detail views of another embodiment of the invention.

Referring to the drawings, 10 designates the frame of a motor vehicle on which rests a removable body 11 having a seat 14, a flooring 12 and a dash cowl 13. The usual steering post 15, clutch pedal 16 and brake lever 17 are also illustrated. Supported on the frame in front of the body is a hydrocarbon motor 18 the base of which has a rearward extension below the flooring 12 in the form of a casing for the change speed gear mechanism 19 which has the usual gear shifter rods 20.

The casing for the gear mechanism extends upwardly to form a support 21 for a pair of vertically extending levers or bars 23 pivoted at 22 in said support. These bars are mounted relatively close together, and each bar at its lower end is connected to one of the shifter rods 20 as by the pin and slot connection shown. The bars or levers are adapted to be rocked on their pivots to shift the rods 20 and at their upper ends are formed with slots 31 which are adapted to aline when the levers are in intermediate or neutral position.

For the purpose of operating the levers 23 a hand device or control member 26 is mounted on a part of the body 11 above the levers 23. As shown the dash cowl 13 affords a bearing 27 for this hand device so that the handle 29 thereof is arranged immediately in the rear of the downwardly turned part 28 of the cowl. The inner or forward end of the device 26 is downturned at 30 and adapted to engage the slots 31 above described in the upper ends of the bars 23.

The bars 23 extend through an opening 23' in the flooring 12. The hand device or control member however, is mounted in the vehicle body in front of the seat 14 and within reach of the driver, in the drawing said device being shown as conveniently mounted in the dash cowl. The engagement between the hand device 26 and the upright bars 23 is readily detachable so that as the body is lifted off of the frame the engagement is broken and the device removed with the body while the shifter elements remain on the frame. The body can thus be easily removed and replaced.

When the gears are in neutral position the member 26 may be oscillated in its bearing 27 to thereby swing its downturned end 30 into engagement with the slot 31 in one of the bars 23. The member in engagement with a bar may then be drawn toward or pushed away from the operator to shift one of the gear elements. One of the bars is shown in shifted position in Fig. 3. The parts may be returned to neutral and the device oscillated to engage and shift the other rod.

In the embodiment shown in Figs. 4, 5 and 6, a rod 32 and tube 33 are provided for operating the shifter rods 20 being detachably connected thereto by arms 34 resting in grooves 20' in said rods. The tube 33 is rotatably mounted in a projection 35 from the dash cowl 13 while the rod 32 turns in the tube 33. Projecting from the upper ends of the rod and tube are arms 36 each provided with a fork 37 as shown particularly in Fig. 6. Oscillatable and reciprocable in a bearing 38 on the cowl is a hand device or control member 39 having a handle 40 at one end and an arm 41 at the other end. The arm 41 is so arranged that its end 42 is adapted to enter either of the forks 37. The operation of this embodiment is very similar to that described above in connection with the first form. The member 39 is first swung into engagement with one of the forks 37 and then reciprocated thus rotating one of the uprights 32 or 33 and reciprocating the shifter rod connected thereto.

Figs. 7, 8 and 9 show an embodiment in which only a single upright member 44 is employed. The shifter rods 20 are provided with forked projections 45 in which the end of an arm 46 on the lower end of the member 44 can enter. At the upper end of the rod 44 is an arm 47 provided with a ball 48. A control member 49 mounted in the cowl is provided with a fork each member of which is cupped to partly inclose the ball 48. As the member 49 is oscillated the rod 44 is reciprocated and the arm 46 is brought into engagement with the fork 45 on the desired rod 20. Reciprocation of the member 49 will rotate the rod 44 thus reciprocating the selected shifter rod and bringing the proper gears into mesh.

A single rod 50 is employed in the form shown in Figs. 10 and 11 to actuate the shifter rods 20. The rod 50 is provided with a ball 51 which turns in a socket 52 shown as an extension of the flooring 12. The shifter rods 20 are provided with forked projections 53 presenting toward each other and into which the lower end 54 of the rod 50 enters. At the upper end of the rod 50 is a cup 55 adapted to receive a ball 56 on the down-turned end of the control member 57, said member being mounted in bearings 58 in the cowl 13 and having a handle 59. Oscillation of the member 57 swings the lower end of the rod 50 into engagement with the forked projection 53 of one shifter rod, and the subsequent reciprocation of the member 57 swings the lower end 54 at right angles to its first movement and reciprocates the shifter rod 20 to which it is temporarily joined.

In the last three embodiments the shifter rods 20 are mounted on the frame while the hand device or control member and the uprights connecting the hand device with the shifter rods are mounted on the vehicle body. The engagement of the uprights with the shifter rods is readily detachable so that when the body is lifted from the frame the connection is broken and when a body is placed on the frame the proper connection can readily be made.

While several embodiments of the invention have been shown and described applicant is not limited thereto since it is obvious that changes could be made without departing from the spirit or scope of the invention as set forth in the annexed claims.

Having thus described my invention, what I claim and desire to secure by Letters Patent is:—

1. In a motor vehicle, in combination, a body having a dash cowl, gear operating mechanism, and controlling means for said mechanism mounted in said cowl.

2. In a motor vehicle, in combination, a body having a dash cowl, gear operating mechanism, and controlling means for said mechanism centrally located in said cowl.

3. In a motor vehicle, in combination, a body having a cowl arranged forwardly of the driver's seat, change gear mechanism, and gear controlling means mounted in said cowl.

4. In a motor vehicle, in combination, a body having a dash cowl, gear shifter elements, and means mounted in the cowl for operating said elements.

5. In a motor vehicle, in combination, a body having a dash cowl, gear shifter elements, levers connected to said elements and extending upwardly therefrom adjacent said cowl, and means mounted in the cowl for operating said levers.

6. In a motor vehicle, in combination, a body having a dash cowl, gear shifter elements, levers connected to said elements and extending upwardly therefrom adjacent said cowl, and a hand operated device mounted in said cowl and adapted to select and operate either one of said levers.

7. In a motor vehicle, in combination, a body having a dash cowl, gear shifter elements, levers connected to said elements and extending upwardly therefrom adjacent said cowl, and a horizontally sliding hand operated device mounted in said cowl for operating said levers.

8. In a motor vehicle, in combination, a body having a driver's seat, gear shifter elements, horizontally pivoted levers connected to said elements and extending upwardly therefrom in front of said seat, and a device within reach of the operator and adapted to select and operate said levers.

9. In a motor vehicle, in combination, change speed gear mechanism, shifter rods, vertically arranged means adapted to actuate said rods, hand operated means reciprocably mounted in said motor vehicle, and connections between said vertically arranged means and said reciprocatory means whereby said shifter rods are actuated upon the reciprocation of said hand operated means.

10. In a motor vehicle, in combination, change speed gear mechanism, gear shifter rods, bars oscillatably mounted on said mechanism and adapted to operate said rods, and means reciprocably and oscillatably mounted in said motor vehicle adapted to select and actuate one of said bars.

11. In a motor vehicle, in combination, change speed gear mechanism, gear shifter rods, parallel bars oscillatably mounted on said mechanism and adapted to operate said rods, and means reciprocably and oscillatably mounted in said vehicle adapted to select by an oscillatory movement and to actuate by a reciprocatory movement one of said bars.

12. In a motor vehicle, in combination, a cowl, change speed gear mechanism, gear shifter rods, bars oscillatably mounted on said mechanism and adapted to operate said rods, and means reciprocably and oscillatably mounted in said cowl adapted to select and actuate one of said bars.

13. In a motor vehicle, in combination, a cowl, change speed gear mechanism, gear shifter rods, bars oscillatably mounted on said mechanism and adapted to operate said rods, and means reciprocably and oscillatably mounted in said cowl adapted to select by an oscillatory movement and to actuate by a reciprocatory movement one of said bars.

14. In a motor vehicle, in combination, change speed gear mechanism, gear shifter rods, rotatably mounted uprights connected to said rods and reciprocatory and oscillatory means mounted in said motor vehicle for selecting and rotating one of said uprights.

15. In a motor vehicle, in combination, change speed gear mechanism, gear shifter rods, rotatably mounted uprights connected to said rods, and reciprocatory and oscillatory means mounted in said motor vehicle adapted to select by an oscillatory movement and to rotate by a reciprocatory movement one of said uprights.

16. In a motor vehicle, in combination, a cowl, change speed gear mechanism, gear shifter rods, a vertically mounted tube connected to one of said rods, a vertically mounted rod connected to the other of said rods, said rod being positioned within said tube and means mounted on said cowl for selecting and rotating either said rod or said tube.

17. In a motor vehicle, in combination, a cowl, change speed gear mechanism, gear shifter rods, projections from said rods, a vertically mounted rod adapted to move in more than one direction, and means mounted in said cowl for moving said last named rod in one direction to select either shifter rod and in another direction to actuate said selected shifter rod.

18. In a motor vehicle, in combination, a cowl, change speed gear mechanism, gear shifter rods, projections from said rods, a vertically mounted rod adapted to reciprocate or oscillate, and means mounted in said cowl for reciprocating said last named rod into engagement with one of said shifter rods and for oscillating said vertically mounted rod for actuating said selected shifter rod.

19. In a motor vehicle, in combination, a cowl, change speed gear mechanism, gear shifter rods, a vertically mounted rod adapted to oscillate in a plurality of directions, and means mounted in said cowl for oscillating said rod in one direction to select one of said shifter rods and in another direction to oscillate said selected shifter rod.

20. In a motor vehicle, in combination, a cowl, change speed gear mechanism, gear shifter rods, a vertically mounted rod adapted to oscillate in a plurality of directions, and oscillatory and reciprocatory means mounted in said cowl adapted to oscillate said rod in one direction to select one of said shifter rods by an oscillatory movement and in another direction by a reciprocatory movement to actuate said selected shifter rod.

21. In a motor vehicle, in combination, sliding gear shifter elements, levers connected thereto, and a hand operated device adapted to slide substantially parallel to said elements and to operate the latter through said levers.

22. In a motor vehicle, in combination, a frame, gearing and shifter elements mounted thereon, a body mounted on the frame, a hand device mounted on the body, and interconnecting means between said device and said elements.

23. In a motor vehicle, in combination, a frame, gearing and shifter elements mounted thereon, a body mounted on the frame, a hand device mounted on the body, and readily detachable interconnecting means between said device and said elements.

24. In a motor vehicle, in combination, a frame, gearing and shifter elements mounted thereon, a body mounted on the frame, connections on said shifter elements extending upwardly into the body, and a hand device mounted on the body and adapted to coöperate with said connections.

25. In a motor vehicle, in combination, a frame, gearing and shifter elements mounted thereon, a body mounted on the frame, said body having an opening therein above said elements, levers attached to said elements and extending upwardly through said opening, and a hand device mounted on the body and adapted to control said levers.

26. In a motor vehicle, in combination, gear shifter elements, a hand device adapted to be rocked and to be moved longitudinally, and connections between said device and said elements, the rocking movement of said device shifting the connections so that either one or the other of said elements may be moved by said device, and the longitudinal movement of said device operating through said connections to move one of said gear shifter elements.

27. In a motor vehicle, in combination, gear shifter elements, a hand device mounted to rock about an axis from one position to another and to be moved longitudinally on said axis when in either of said rocked positions, and connections from said device to said elements to shift one of said elements with a longitudinal movement of said device when the latter is in one of its rocked positions, and to shift another of said elements with a like movement of said device when the latter is in the other of its rocked positions.

28. In a motor vehicle, in combination, gear shifter elements, a hand device mounted to rock about an axis from one operating position to another, and to be moved longitudinally when in either of said operating positions, and connections between said device and said elements to cause a shifting of one of said elements by the longitudinal movement of said device when in one of its said operating positions, and a shifting of the other of said elements by such movements of the device when in the other of its said operating positions.

29. In a motor vehicle, in combination, gear shifter elements, a hand device mounted to rock about an axis from one operating position to another, and to be moved longitudinally when in either of said operating positions, connections from said device to one of said shifter elements operable by said device when in one of its operating positions, and connections from said device to another of said elements operable by said device when in the other of its operating positions.

30. In a motor vehicle, in combination, gear shifter elements, a hand device mounted to move from one operating position to another, and to be moved longitudinally when in either of said operating positions, and connections between said device and said elements to cause a shifting of one of said elements by the longitudinal movement of said device when in one of its said operating positions, and a shifting of the other of said elements by such movement of the device when in the other of its said operating positions.

31. In a motor vehicle, in combination, gear shifter elements, a hand device mounted to move from one operating position to another, and to be moved longitudinally when in either of said operating positions, connections from said device to one of said shifter elements operable by said device when in one of its operating positions, and connections from said device to another of said elements operable by said device when in the other of its operating positions.

Aug. 16th, '16.

In testimony whereof I affix my signature.

EDWARD H. BELDEN.